United States Patent [19]

Sherman

[11] Patent Number: 4,908,980

[45] Date of Patent: Mar. 20, 1990

[54] FLYING INSECT CONTROL DEVICE

[76] Inventor: Daniel Sherman, 1355 Bobolink Pl., Los Angeles, Calif. 90069

[21] Appl. No.: 264,375

[22] Filed: Oct. 31, 1988

[51] Int. Cl.⁴ .............................................. A01M 1/20
[52] U.S. Cl. ...................................... 43/132.1; 43/131
[58] Field of Search ...................... 43/132.1, 114, 131, 43/121, 125

[56] References Cited

U.S. PATENT DOCUMENTS

| | | | |
|---|---|---|---|
| 3,653,145 | 4/1972 | Stout | 43/131 |
| 4,160,335 | 7/1979 | Von Kohorn et al. | 43/131 |
| 4,227,333 | 10/1980 | Levinson et al. | 43/132.1 |
| 4,350,678 | 9/1981 | Palvarini et al. | 43/131 |
| 4,411,093 | 10/1983 | Stout et al. | 43/114 |

Primary Examiner—M. Jordan

[57] ABSTRACT

This invention relates to the control of flying insects in and around homes, commercial establishments, farm buildings and the like. Specifically, the formulation, design and technique involved in the device allows the user to maintain an insect free environment and to dispense an insecticide capable of eliminating flying insects in a safe and effective manner. The use of a translucent shield that contains an insecticide that leeches to the surface through the heat of ambient light, while converting ambient light into a spectrum that attracts flying insects provides an economical method of delivering a killing agent to the insect.

3 Claims, 1 Drawing Sheet

FLYING INSECT CONTROL DEVICE

BACKGROUND OF THE INVENTION

Flying insects have plagued mankind throughout recorded history. They spread disease and filth, soil foodstuffs and in general make an environment less favorable to humans and domestic animals.

Many methods of eliminating these pest have evolved through the years and they include devices that range from the basic flyswatter, to sticky paper that traps the insects, to poisoned baits, to electrical devices that lure the insect to its death by electrocution.

Although all of these devices have proven to be effective, they leave a large gap in practical use because of size, expense, danger to nontarget species or complexity of application.

The object of the instant invention is to provide a safe and economical method of attracting flying insects to an area that hash been treated by an insecticide while clearly indicating where that insecticide is located.

Another object of the invention to to convert the ambient light that is generated either by artificial means or by natural sunlight into a spectrum that attracts flying insects to a specific target area.

Yet another object of the invention is to impregnate a plastic translucent shield with an insecticide that will leech to the surface as the heat from either room temperature or an artificial source is applied to it.

And further, the invention provides a method of delivering a premeasured dose of insecticide, enough to kill the target insect, while preventing overuse and leaving behind doses that could harm other non target species.

Additionally, the use of the impregnated plastic allows for the implementation of a lure system that is printed onto the plastic to bring the insects to the point of contact with the insecticide.

And, the use of a plastic that has been thoroughly impregnated with an insecticide will allow for a longer active life of the insecticide as it only reaches the surface in limited amounts that are replenished only when depleted.

These and other new and novel features of the instant invention are taught by the following descriptions and drawings and are not limited to the configurations contained herein.

DETAILED DESCRIPTION OF THE DRAWINGS

Figure 1:
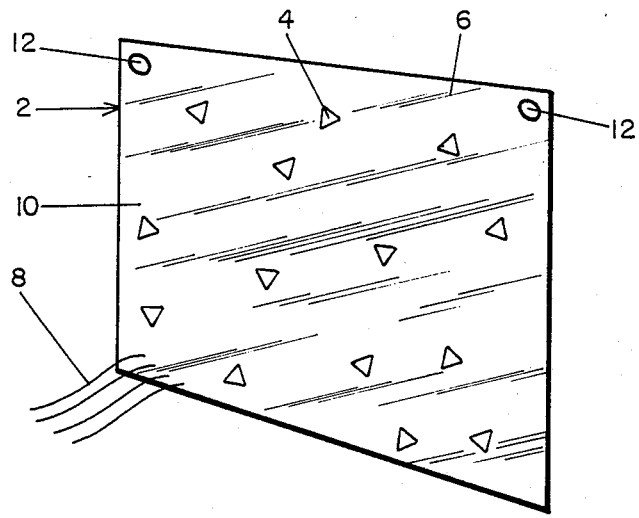
FIG. 1 demonstrates the basic configuration of the shield which has been formulated with an insecticide impregnated into the molded or extruded sheet. The sheet is shown to have a method of securing it to a surface and the lure type graphic are spread throughout the surface of the sheet. The translucent quality is demonstrated.

As can be seen in FIG. 1 the Flying Insect Control Device is depicted generally as 2 and in formed as a flat sheet composed of a plastic molded or extruded material 10. Imprinted on the surface of the sheet are graphic designs 4 that can be random in nature or be actual renderings of objects or similar insects to act as lure or decoys for the target insect. In fabricating the plastic sheet 10 for manufacture, an insecticide 6 is mixed with the appropriate resin to form a compound of resin and insecticide. This meshing of the plastic 10 and the insecticide 6 forms a bonded structure that releases the insecticide at a timed rate based upon the density of the plastic material and the amount of heat applied to it. We also see in FIG. 1 two adhesive strips 12 located at opposing ends of the sheet. These strips are use to secure the device to a wall or other similar structure. The translucent quality of the material is depicted as light waves 8 which pass through the plastic to convert the ambient light into a spectrum that attracts the target insect.

Figure 2:
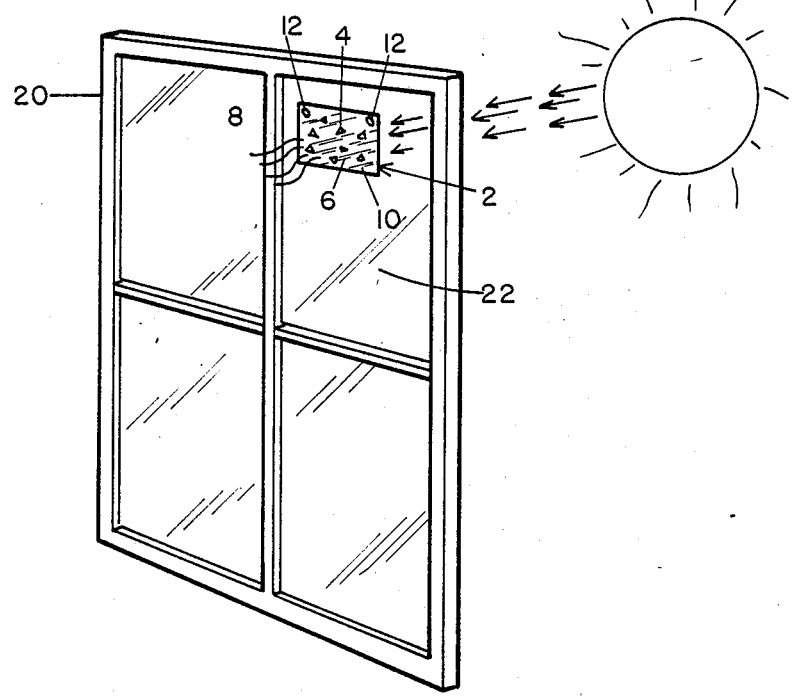
In FIG. 2 we demonstrate the device as affixed to a window and once again show the inherent features contained within the impregnated plastic sheet. In this rendering the use of natural light is demonstrated as a method of generating both conversion of light spectrum and the heat needed to insure the replenishment of the insecticide to the surface of the sheet.

FIG. 2 demonstrates the use of the Flying Insect Control Device 2 when used in conjunction with natural light. The impregnated plastic sheet 2 has been fastened to a window pane 22 located within the structure of a 4 pane window 20. The sun casts both light and heat through the pane 22 and this light and heat is transferred directly through the control device 2 which converts the natural spectrum of the sunlight into the desired spectrum 8 on the interior of the pane 22. The plastic 10 has been heated up and leeches the insecticide 6 to the surface. This enables the insecticide 6 to be positioned on the exterior of the device 2 and to be presented in a manner that will come into contact with any insect liting on said surface. The flying insects being attracted by the graphics 4 and the attractive light spectrum 8 lite on the device 2 and are then subject to the dose of poison 6 in order to kill them.

Figure 3:
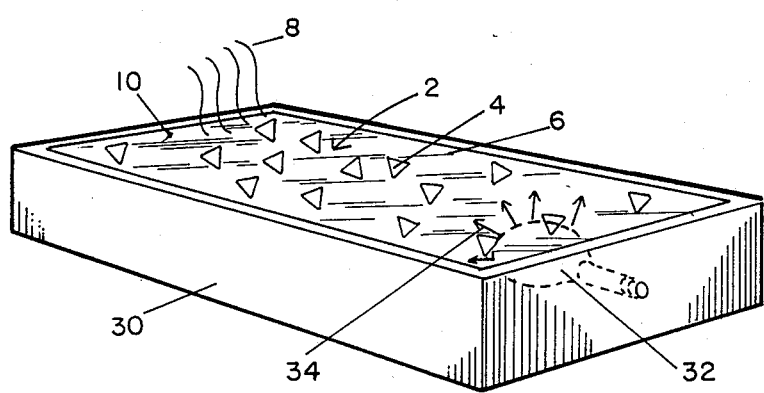
FIG. 3 shows the impregnated plastic sheet, with the aforementioned features as applied to a source of artificial light and heat. This allows for use of the device in areas where no natural light may be present or in areas where it is desirable to draw the insects away from surfaces they might contaminate.

In FIG. 3 we see the Flying Insect Control Device 2 in use with an artificial light and heat source 30. An electric bulb 32 emits light and heat that passes through the translucent plastic 10 and emerges as the desired spectrum of light 8. The heat generated from the bulb 32 causes the insecticide 6 to rise to the surface of the plastic 10 and deliver a lethal dose to an insect liting upon said surface. The decoys or graphics 4 along with the converted light spectrum 8 draw the target insect to the surface and effectively destroy it.

What I claim is:

1. A Flying Insect Control Device consisting of a translucent colored plastic sheet capable of converting ambient light that passes through said sheet into a colored spectrum of light that attracts flying insects; said plastic sheet having been compounded with an insecticide as an integral; heat caused by ambient light passing through said translucent colored plastic sheet causing said insecticide to leeching through said sheet to its surface and coating said surface with a lethal dose of poison capable of killing an insect liting on said surface; said surface imprinted with graphics or decoys capable of attracting flying insects to it.

2. A Flying Insect Control Device as in claim 1; said device having a self adhesive strip located at its rear to allow said device to be affixed to a structure or wall.

3. A Flying Insect Control Device as in claim 1 capable of being fitted into an independent holder containing an artificial light and heat source.

* * * * *